(12) United States Patent
Berry et al.

(10) Patent No.: US 9,713,975 B2
(45) Date of Patent: Jul. 25, 2017

(54) VEHICLE SEATING ASSEMBLY HAVING A BLOWER MOUNTED TO THE SEATBACK AGAINST A PLASTIC MATRIX

(71) Applicant: FORD GLOBAL TECHNOLOGIES, LLC, Dearborn, MI (US)

(72) Inventors: S. M. Akbar Berry, Windsor (CA); Johnathan Andrew Line, Northville, MI (US); Nicholas Alphonse Billardello, Macomb, MI (US); Richard Joseph Soyka, Shelby Township, MI (US); Marcos Silva Kondrad, Macomb Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/674,371

(22) Filed: Mar. 31, 2015

(65) Prior Publication Data

US 2016/0288678 A1    Oct. 6, 2016

(51) Int. Cl.
  *B60N 2/56*    (2006.01)
  *B60N 2/64*    (2006.01)
  *B60N 2/68*    (2006.01)

(52) U.S. Cl.
  CPC ........... *B60N 2/565* (2013.01); *B60N 2/5642* (2013.01); *B60N 2/64* (2013.01); *B60N 2/68* (2013.01)

(58) Field of Classification Search
  CPC ........ B60N 2/565; B60N 2/5642; B60N 2/64; B60N 2/68
  See application file for complete search history.

(56) References Cited

U.S. PATENT DOCUMENTS

| 4,324,431 A | 4/1982 | Murphy et al. |
| 4,629,248 A | 12/1986 | Mawbey |
| 5,658,050 A | 8/1997 | Lorbiecki |
| 5,692,802 A | 12/1997 | Aufrere et al. |
| 5,758,924 A | 6/1998 | Vishey |

(Continued)

FOREIGN PATENT DOCUMENTS

| DE | 10 2006 061 226 | 6/2008 |
| DE | 10 2012 006 074 | 11/2012 |

(Continued)

*Primary Examiner* — Charles A. Fox
*Assistant Examiner* — Christopher E Veraa
(74) *Attorney, Agent, or Firm* — Vichit Chea; Price Heneveld LLP

(57) ABSTRACT

A vehicle seating assembly for a motor vehicle has raised seatback that includes a permeable foam layer having a plurality of spaced apertures. A distribution system having airflow passages is juxtaposed against the permeable foam layer, such that the airflow passages of the distribution system are in fluid communication with the apertures in the permeable foam layer. A carrier assembly is juxtaposed against the distribution system and has an upper portion having a central annual member supported by a plurality of flexible radial arms, to which is attached a blower in fluid communication with the airflow passages of the distribution system and the apertures in the permeable foam layer. Warm air from the permeable foam layer is displaced away from the permeable foam layer and is circulated through the raised seatback by operation of the blower.

20 Claims, 8 Drawing Sheets

(56) References Cited

U.S. PATENT DOCUMENTS

| | | | | |
|---|---|---|---|---|
| 6,003,950 A * | 12/1999 | Larsson | .................... | A47C 7/74 297/180.13 |
| 6,079,781 A | 6/2000 | Tilley | | |
| 7,261,371 B2 * | 8/2007 | Thunissen | ................ | B60N 2/56 297/180.14 |
| 7,261,372 B2 * | 8/2007 | Aoki | .................... | B60N 2/5635 297/180.13 |
| 7,467,823 B2 * | 12/2008 | Hartwich | ........... | B60H 1/00285 297/180.14 |
| 7,475,464 B2 * | 1/2009 | Lofy | .................... | B60N 2/5628 165/46 |
| 7,506,924 B2 * | 3/2009 | Bargheer | ............. | B60N 2/4876 297/180.14 |
| 7,607,739 B2 * | 10/2009 | Browne | ............... | B60N 2/5621 297/180.1 |
| 7,802,843 B2 * | 9/2010 | Andersson | ........... | B60N 2/5635 297/180.14 |
| 7,827,805 B2 * | 11/2010 | Comiskey | ............ | B60N 2/5635 62/244 |
| 7,905,545 B2 * | 3/2011 | Andersson | ........... | B60N 2/0232 297/180.1 |
| 7,963,595 B2 * | 6/2011 | Ito | ........................ | B60N 2/5657 297/180.1 |
| 7,966,835 B2 | 6/2011 | Petrovski | | |
| 7,976,060 B2 * | 7/2011 | Breed | ........................... | 180/273 |
| 7,997,649 B2 * | 8/2011 | Vanparys | ............... | A47C 7/465 297/284.2 |
| 8,516,842 B2 | 8/2013 | Petrovski | | |
| 8,539,624 B2 * | 9/2013 | Terech | ..................... | A47C 7/74 5/423 |
| 8,727,434 B2 * | 5/2014 | Sahashi | ................ | B60N 2/5635 297/180.13 |
| 2007/0200398 A1 | 8/2007 | Wolas et al. | | |
| 2012/0256450 A1 * | 10/2012 | Sahashi | ................ | B60N 2/5635 297/180.14 |
| 2013/0285426 A1 | 10/2013 | Arant et al. | | |
| 2014/0203606 A1 | 7/2014 | Line et al. | | |

FOREIGN PATENT DOCUMENTS

| | | |
|---|---|---|
| EP | 0 670 240 | 2/1995 |
| JP | 2011-251573 | 12/2011 |
| KR | 10-2008-0066428 | 7/2008 |
| KR | 10 2011 0051692 | 5/2011 |
| KR | 10-1180702 | 9/2012 |
| WO | 2010096307 | 8/2010 |

* cited by examiner

VEHICLE SEATING ASSEMBLY HAVING A BLOWER MOUNTED TO THE SEATBACK AGAINST A PLASTIC MATRIX

FIELD OF THE INVENTION

The present invention generally relates to a vehicle seating assembly, and more particularly to a vehicle seating assembly having a climate controlled seatback utilizing a blower mounted to the seatback against a plastic matrix.

BACKGROUND OF THE INVENTION

Vehicle seating assemblies typically include a horizontal seating support and a generally upright seatback. Vehicle seat comfort has become increasingly important as passengers take longer trips, and the present disclosure relates to the problem of occupant-generated heat that may become concentrated in the seatback cushion. This heat concentration especially occurs when a user sits in the vehicle seating assembly on a hot day for extended periods of time. The excessive body heat that gets trapped between the passenger and the seatback can cause discomfort. Many times, passengers will shift around in the seat to release the trapped heat. If the driver does this, it could create a hazard. Accordingly, there is a need to have a vehicle seatback that resolves the problem related to heat build-up in the seatback.

SUMMARY OF THE INVENTION

One aspect of the present invention includes a seating assembly having a lower seating structure and a raised seatback support for supporting an occupant. One or both of the lower seating structures of the raised seatback includes a permeable foam layer upon which an occupant is supported. The permeable foam layer has a forward and rearward surface and a plurality of spaced apertures extending therethrough between the forward and rearward surfaces within which an airflow may be created. A distribution system having airflow passages therethrough is juxtaposed against the permeable foam layer, such that the airflow passages of the distribution system are in fluid communication with the apertures in the permeable foam layer. A carrier assembly is juxtaposed against the distribution system and has an upper portion having a central annual member supported by a plurality of flexible radial arms, to which is attached a blower, the blower being in fluid communication with the airflow passages of the distribution system and the apertures in the permeable foam layer. Warm air proximate the forward surface of the permeable foam layer is displaced away from the forward surface of the permeable foam layer and is circulated through the raised seatback by operation of the blower.

Yet another aspect of the present invention includes a vehicle seatback comprising a foam layer having apertures, a distribution system having passages in fluid communication with the apertures, a carrier assembly having a central annual member supported by flexible radial arms, and a blower attached to the central annual member in fluid communication with the passages and the apertures, whereby air is displaced away from the foam layer by operation of the blower.

A still further aspect of the present invention includes a method of cooling a vehicle seat, the method comprising the steps of providing a permeable foam layer upon which an occupant is supported, the permeable foam layer having a forward and rearward surface and a plurality of spaced apertures extending therethrough between the forward and rearward surfaces within which an airflow may be created. A distribution system having airflow passages therethrough is then disposed against the permeable foam layer, the airflow passages of the distribution system being in fluid communication with the apertures in the permeable foam layer. A carrier assembly is disposed against the distribution system and has an upper portion having a central annual member supported by a plurality of flexible radial arms. A blower is attached to the central annular member of the carrier assembly, the blower being in fluid communication with the airflow passages of the distribution system and the apertures in the permeable foam layer. The blower is then operated whereby air proximate the forward surface of the permeable foam layer is displaced away from the forward surface of the permeable foam layer and is circulated through the raised seatback by operation of the blower.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
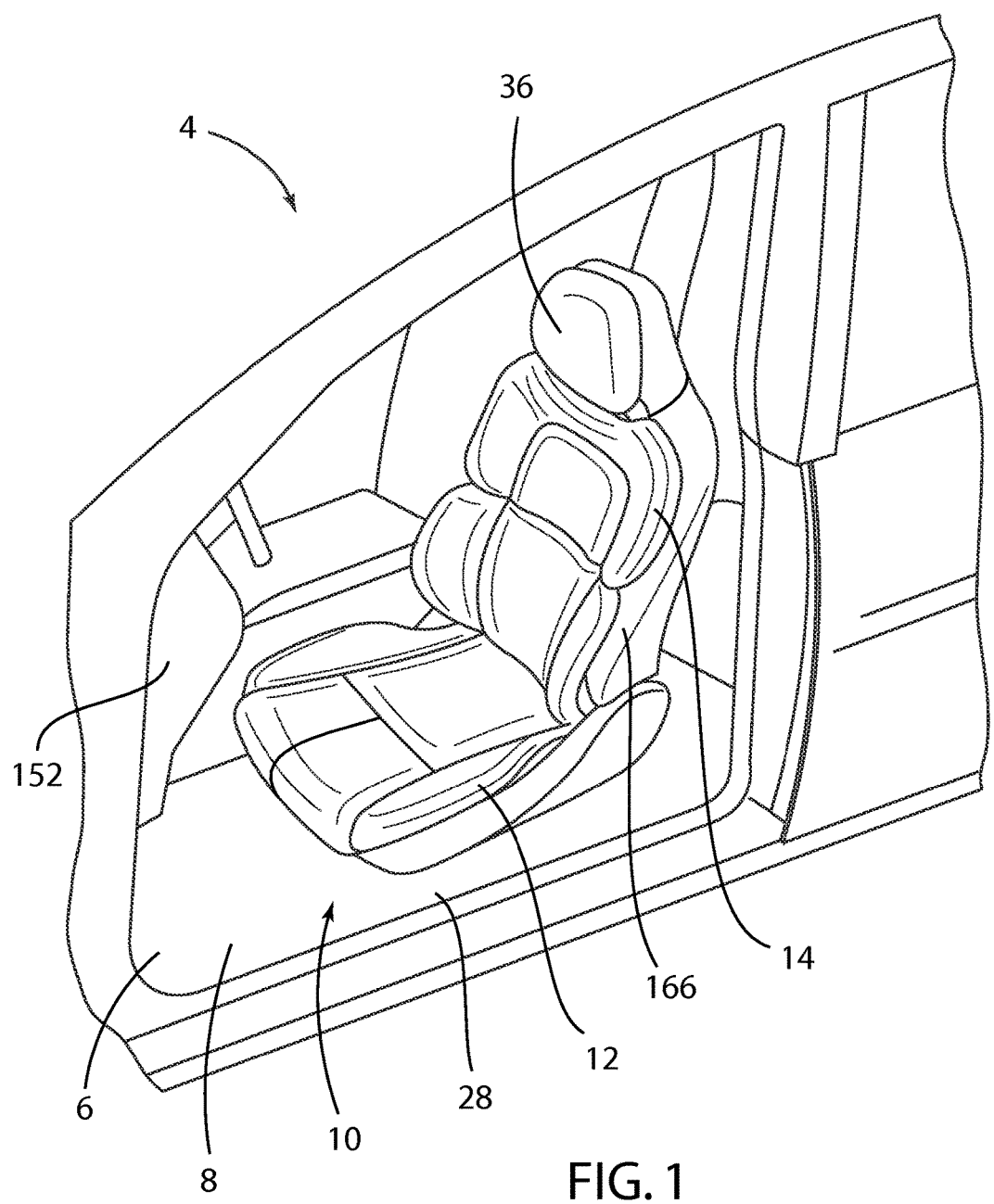
FIG. 1 is a top perspective view of a vehicle seat assembly disposed inside a vehicle.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
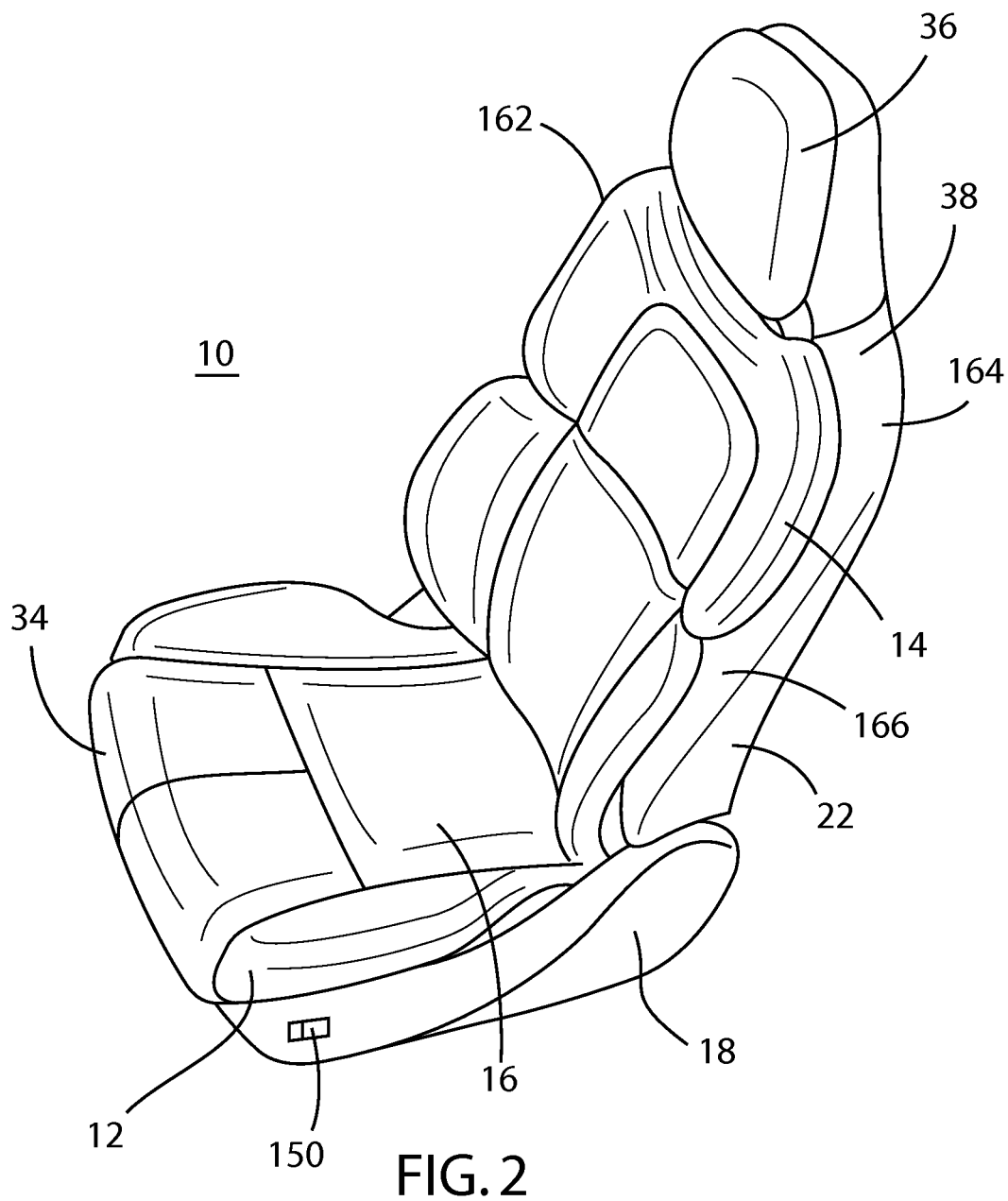
FIG. 2 is a top perspective view of the vehicle seat assembly according to the present disclosure.

Referring to FIGS. 1-2, reference numeral 10 generally designates a seat assembly for use in a vehicle occupant compartment 6 of a motor vehicle 4. As shown in FIG. 1, the vehicle seating assembly 10 is generally configured for use in a variety of motor vehicles 4 in a front driver seat, a front passenger seat, or a rear seat of the motor vehicle 4. Referring now to FIG. 2, the vehicle seating assembly 10 includes a lower seating structure 12 configured to support the occupant's buttocks and upper thighs and a raised seatback support 14 pivotally coupled to the lower seating structure 12. The raised seatback support 14 is configured to support the occupant's back and, except as described herein below, may be constructed in similar fashion to the lower seating structure 12, where the cooling benefits of the present disclosure may be obtained.

The vehicle seating assembly 10 is configured to be mounted on a support surface, such as a floor pan 8 of the vehicle 4. A seat track assembly (not shown) may be coupled to the lower seating structure 12 to facilitate fore and aft positioning of the vehicle seating assembly 10. The vehicle seating assembly 10 is generally designed for the comfort of an occupant, as well as to accommodate and protect the occupant during a collision event. The lower seating structure 12 has a center upholstered portion 16 and a pair of side trim panels 18. The raised seatback support 14 also has a center upholstered portion 20, as well as a clam-shell exterior rear trim panel 22.

Figure 3:
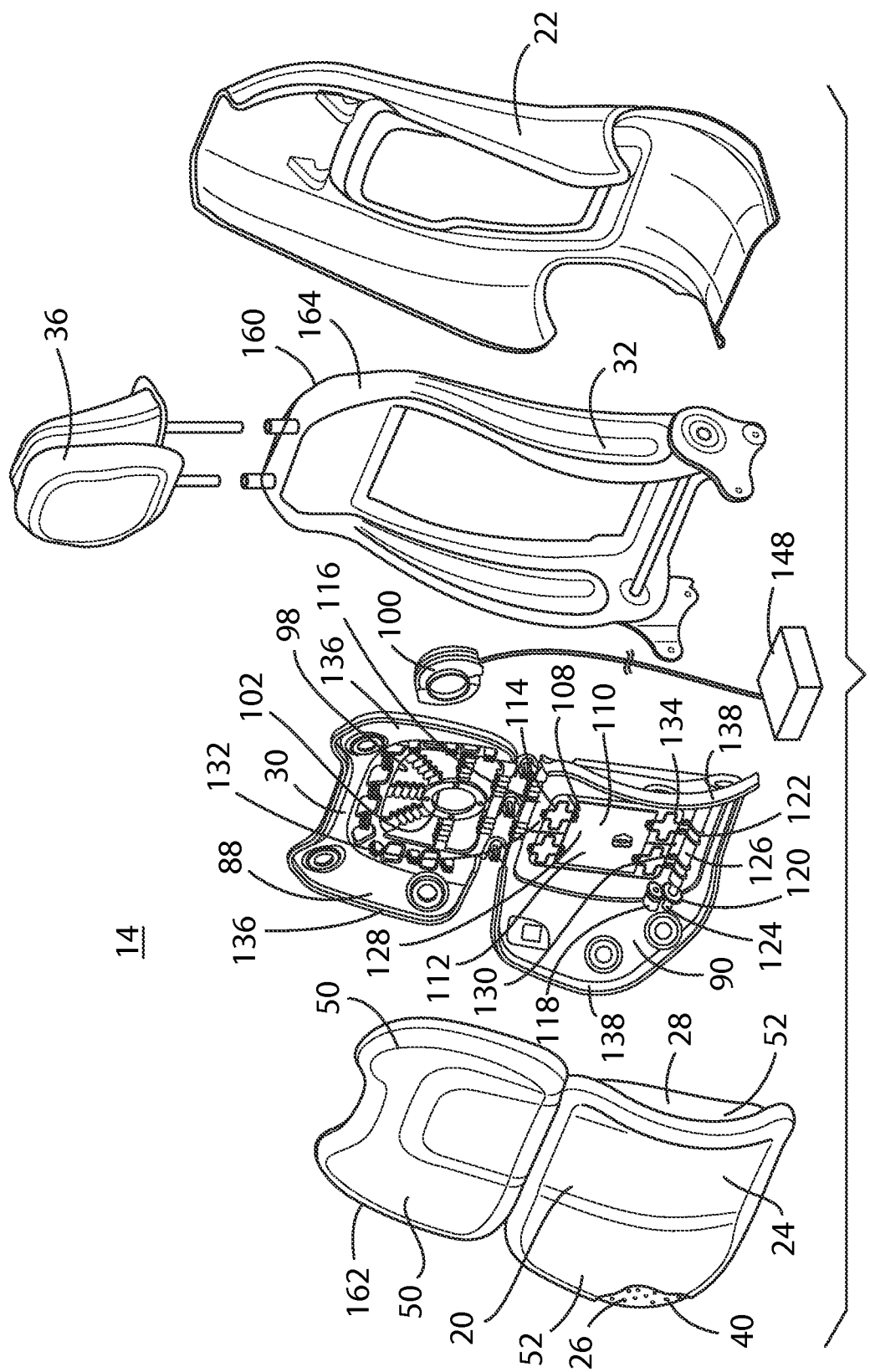
FIG. 3 is a top perspective exploded view of the raised seatback support according to the present disclosure.

Referring to FIG. 3, the construction of the raised seatback support 14 is depicted. However, it should be noted the lower seating structure 12 may also advantageously employ the cooling benefits of the present disclosure, and this disclosure should not be interpreted to exclude such an arrangement. The raised seatback support 14 includes a plurality of interactive layers that function together to provide effective and useful cooling to the occupant of the motor vehicle seat. The raised seatback support 14 generally includes a flexible trim cover 24, a permeable foam layer 26, a distribution system 28, a carrier assembly 30, a frame assembly 32, and the clam-shell exterior rear trim panel 22.

The permeable foam layer 26 is covered by the flexible trim cover 24 of a woven or nonwoven fabric, vinyl, or leather to provide the primary interface between the vehicle seating assembly 10 and the occupant and upon which the occupant is directly supported. The flexible trim cover 24 is coupled to the raised seatback support 14 and covers the raised seatback support 14 in an aesthetically pleasing manner, and preferably complements and is similar, if not identical, to the flexible trim cover 34 on the lower seating structure 12. A head restraint 36 is coupled with an upper portion 38 of the raised seatback support 14 and is substantially centered on the raised seatback support 14.

Figure 4:
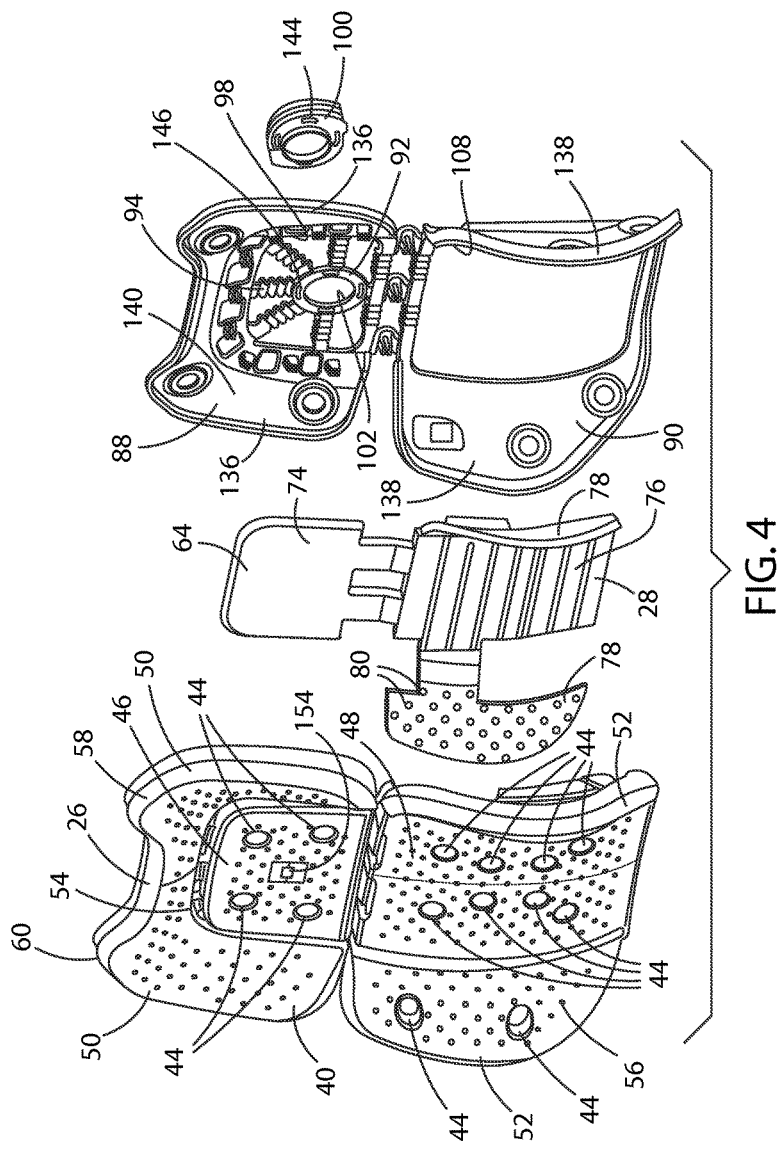
FIG. 4 is a top perspective exploded view of the permeable foam layer, distribution system, carrier assembly, and blower of the raised seatback support according to the present disclosure.
Figure 5:
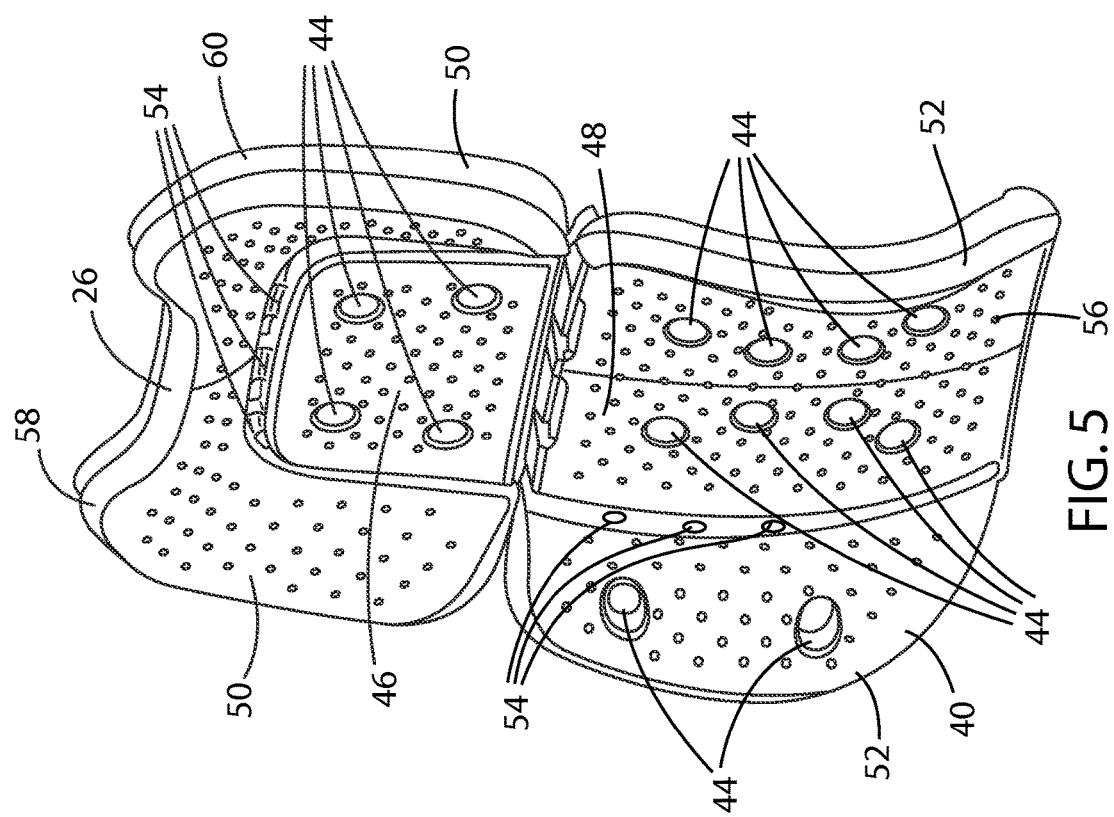
FIG. 5 is a top perspective view of view of the assembled permeable foam layer and distribution system of the raised seatback support according to the present disclosure.
Figure 6:
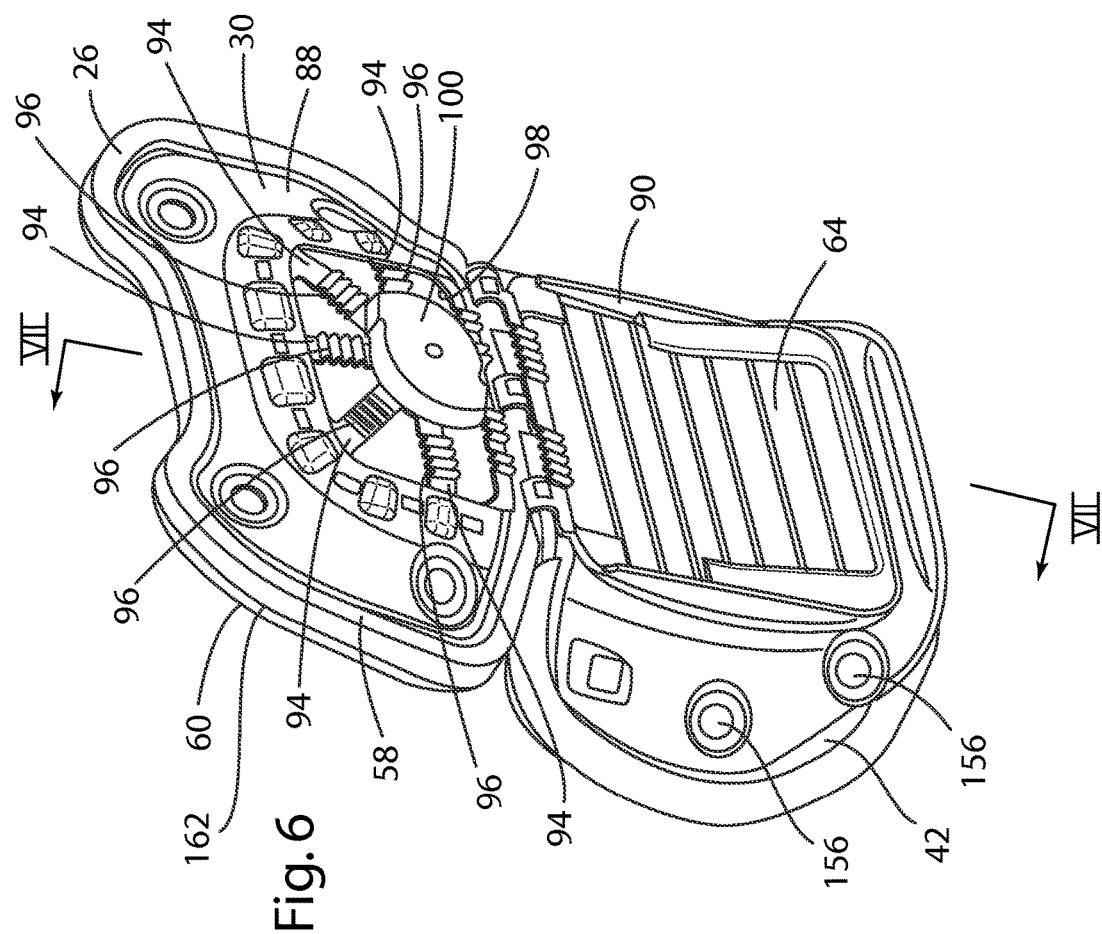
FIG. 6 is a top perspective view of the assembled permeable foam layer, distribution system, carrier assembly, and blower of the raised seatback support according to the present disclosure.

As shown in FIGS. 4 and 5, the permeable foam layer 26 has a forward surface 40, rearward surface 42 and a plurality of spaced apertures 44 extending therethrough between the forward and rearward surfaces 40, 42, within which airflow may be created. The permeable foam layer 26 comprises a central upper portion 46 and a central lower portion 48, each of which is provided with a plurality of spaced apertures 44 extending therethrough between the forward and rearward surfaces 40, 42. A pair of upper wings 50 extends laterally from each side of the central upper portion 46 of the permeable foam layer 26. Similarly, lower wings 52 extend laterally from each side of the central lower portion 48 of the permeable foam layer 26. Each of the lower wings 52 is provided with a plurality of spaced apertures 44 extending therethrough between the forward and rearward surfaces 40, 42. Additional lateral openings 54 extending between the forward and rearward surfaces 40, 42 are provided between the central upper 46 portion and a central lower portion 48 and between the lateral wings 50, 52 extending from each of the central upper portion 46 and a central lower portion 48. A plurality of perforations 56, having a smaller diameter than those of the spaced apertures 44 and likewise extending between the forward and rearward surfaces 40, 42, are distributed throughout the forward and rearward surfaces 40, 42 of the permeable foam layer 26. A rearward facing raised lip 58 is disposed about the perimeter 60 of the permeable foam layer 26 to form a recess 62 proximate the rearward surface 42 of the permeable foam layer 26.

The distribution system 28 comprises a semi-rigid fabric spacer 64 juxtaposed between the permeable foam layer 26 and the carrier assembly 30 and received within a cavity 66 formed on the rearward surface 42 of the permeable foam layer 26. The spacer 64 is fabricated as a single piece from a semi-rigid injection molded thermoplastic material, preferably a semi-rigid polyurethane, and has a non-permeable membrane 68 that forms an airtight skin. The spacer 64 is provided with an air plenum 70 having a plurality of airflow passages 72 to allow airflow passage through the spacer 64. The spacer 64 also includes a central upper portion 74 and a central lower portion 76 corresponding and longitudinally aligned with the central upper and central lower portions 46, 48 of the permeable foam layer 26, where the lower portion 76 of the spacer 64 further includes lower wings 78 that extend laterally from each side of the lower portion 76 of the spacer 64. The lower wings 78 of the central lower portion 76 of the spacer 64 are complementary to and longitudinally aligned with the lower wings 52 of the central lower portion 48 of the permeable foam layer 26. Perforations 80 on a forward surface 82 of the spacer 64 disposed on the lower wings 78 of the spacer 64 are preferably aligned with the apertures 44 disposed on the lower wings 52 of the permeable foam layer 26.

Thus, air is free to flow through and from the spacer 64 and into the permeable foam layer 26. Air flows into the spacer 64 via an external opening 84 in the non-permeable membrane 68 on a rear surface 86 of the spacer 64 proximate the upper portion 38 of the raised seatback support 14, where the external opening 84 is in fluid communication with internal air plenum 70. Air flows through the air plenum 70 and the air passages 72 and out of the spacer 64 via the plurality of perforations 80 on the forward surface 82 of the spacer 64, which are in fluid communication and aligned with the apertures 44 in lower wings 52 of the permeable foam layer 26. It should be appreciated that additional perforations 80 may be provided in other regions or locations on the spacer 64 in order to provide appropriate airflow. As further discussed below, the external opening 84 in the non-permeable membrane 68 is in fluid communication and aligned with the airflow of a blower 100.

Figure 7:
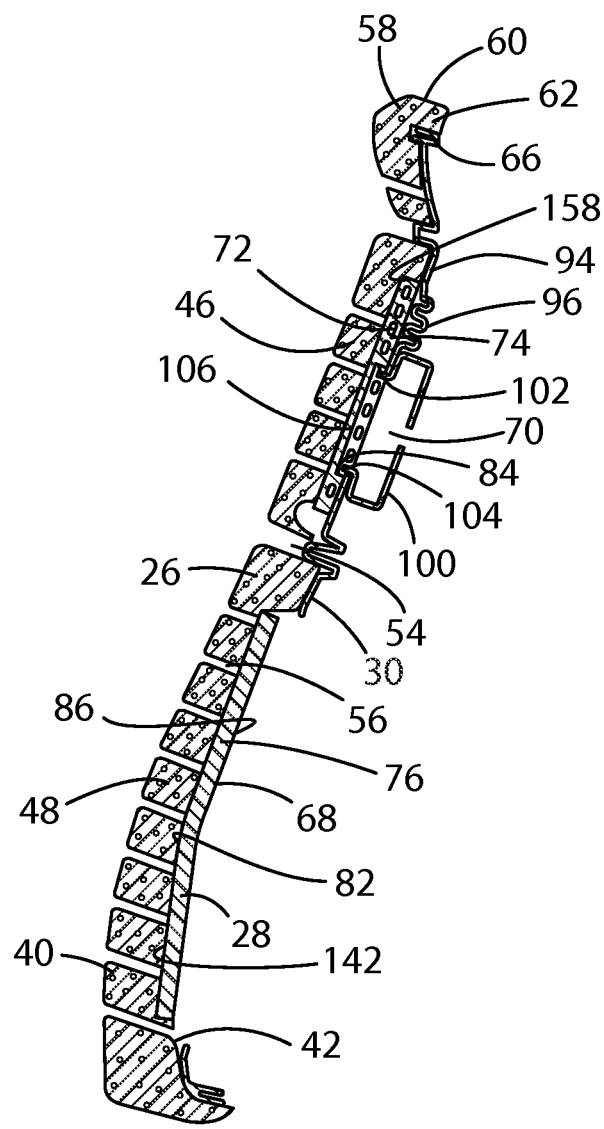
FIG. 7 is a cross-sectional view of the assembled permeable foam layer, distribution system, carrier assembly, and blower of the raised seatback support according to the present disclosure, taken along the line VII-VII in FIG. 6.
Figure 9:
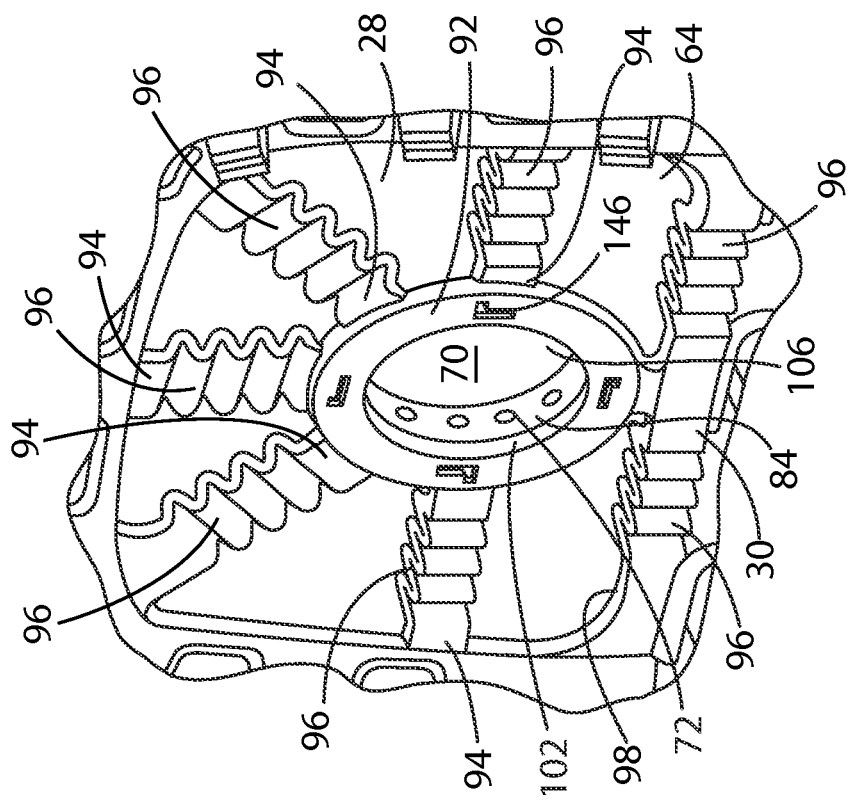
FIG. 9 is a rear perspective view of the distribution system and central annular member of the carrier assembly of the present disclosure.
Figure 8:
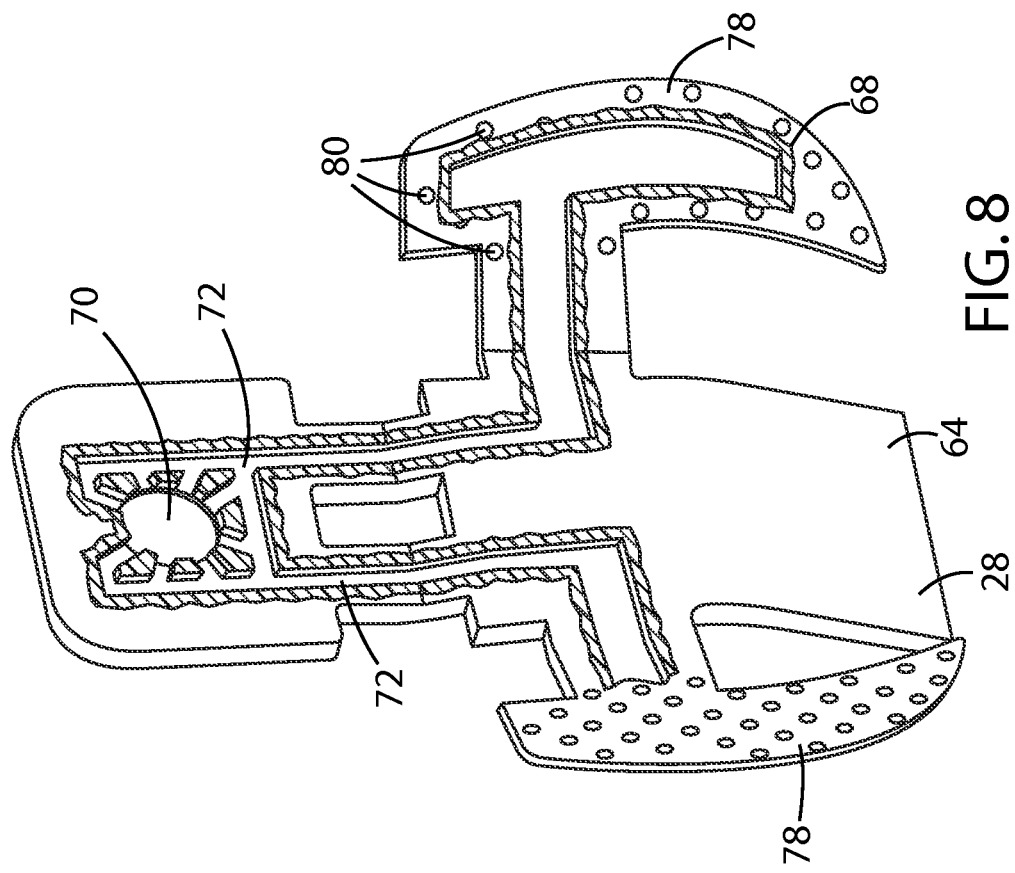
FIG. 8 is partial perspective section view of the distribution system of the present disclosure.

The carrier assembly 30 is likewise juxtaposed against the spacer 64 of the distribution system 28 and received within the recess 62 formed within the rear of the permeable foam layer 26. The carrier assembly 30 is comprised of an upper portion 88 and lower portion 90 corresponding and longitudinally aligned with the upper and lower portions 46, 48, 74, 76 of the permeable foam layer 26 and distribution system 28. The upper portion 88 of the carrier assembly 30 also has a central annular member 92 supported by a plurality of flexible radial arms 94. Each of the flexible radial arms 94 preferably includes a spring element 96 positioned about midway between the central annual member 92 and an upper opening 98 in the upper portion 88 of the carrier assembly 30. This allows the occupant to move or flex the raised seatback support 14, as described below, without interfering with the location and operation of the blower 100. The central annual member 92 has an opening 102 aligned with the external opening 84 of the spacer 64, wherein a nozzle 104 of the blower 100 is received and secured within the opening 102 of the central annual member 92, as shown in FIG. 7. In turn, the external opening 84 of the spacer 64 is in fluid communication and aligned with a recess 106 formed proximate the air plenum 70 of the spacer 64.

The lower portion 90 of the carrier assembly 30 comprises a lower opening 108 within which a suspension layer 110 supporting a flexible panel 112 is mounted to provide adjustable firmness. As shown in FIG. 3, the suspension layer 110 is formed from tunable springs 114 by which the stiffness of the raised seatback support 14 can be adjusted. In one embodiment, at least one variable tension spring 114 is mounted to a frame 116.

The suspension layer 110 includes a motor 118, a gear 120, and a spring attachment member 122. A fixedly mounted connecting rod 124 extends between lateral sides of the seat and a sleeve 126 rotatably encircles the connecting rod 124. The motor 118 and gear 120 are operably coupled to the sleeve 126, and the spring attachment member 122 is rigidly mounted on the sleeve 126. The springs 114 are mounted in tension between the spring attachment member 122, an upper end 128, and lower end 130 of the flexible panel 112, and an upper region 132 of the lower portion 90 of the carrier assembly 30. When activated, the motor 118 and gear 120 are adapted to rotate the sleeve 126 and the spring attachment member 122. Rotating the sleeve 126 and spring attachment member 122 in a first direction moves a lower portion 134 of the variable tension springs 114 downward and increases the tension applied to the variable tension springs 114 and the flexible panel 112. That is, increasing the tension on the springs 114 enables the occupant to select a stiffer seatback support. Additionally, increasing the tension on the variable tension springs 114 decreases the flex or extension thereof, which means the springs 114 and flexible panel 112 will move rearward a smaller distance when placed under load, such as when an occupant leans rearward against the raised seatback support 14.

Conversely, rotating the sleeve 126 and spring attachment member 122 in the opposite direction moves the lower portion 134 of the variable tension springs 114 upward, and decreases the tension applied to the variable tension springs 114 and the flexible panel 112. This decrease in the tension on the springs 114 effectively enables the occupant to select a softer raised seatback support 14. Additionally, the increased flex or extension of the variable tension springs 114 means the springs 114 and flexible panel 112 will move rearward a greater distance when an occupant leans back in the vehicle seating assembly 10.

The carrier assembly 30 also includes a pair of upper and lower flex members 136, 138 laterally extending from each side of the upper portion 88 and the lower portion 90 of the carrier assembly 30, respectively. The upper flex members 136 extend laterally and have a forward facing surface 140 that engages a rearward facing surface 142 of the upper wings 50 of the permeable foam layer 26, and are thus configured to flexibly support the upper back of the occupant.

Similarly, the lower pair of flex members 138 extend laterally from the lower portion 90 of the carrier assembly 30 and engage the lower wings 78 of the spacer 64 that extend laterally from each side of the spacer 64, which in turn engages the lower wings 52 of the permeable foam layer 26, as discussed above. Thus, the lower pair of flex members 138 is configured to likewise flexibly support the lower back of the occupant. Accordingly, the upper and lower pair of flex members 136, 138 each independently supports the upright back of the occupant.

As noted above, the blower 100 is attached to the central annular member 92 of the carrier assembly 30, preferably via a plurality of radially disposed L-shaped locking tabs 144 that engage corresponding radially disposed L-shaped locking slots 146. The blower nozzle 104 is inserted into the opening 102 in the central annual member 92, and the radially disposed L-shaped locking tabs 144 are inserted into the corresponding radially disposed L-shaped locking slots 146. The blower 100 is then rotated so the locking tabs 144 are secured within the locking slots 146 to fix the blower 100 in place. Thus installed, the blower 100 is available to create airflow through the recess 106, air plenum 70, and airflow passages 72 of the distribution system 28, causing air to flow out through the perforations 80 on a forward surface of the spacer 64. As the apertures 44 in the permeable foam layer 26 are aligned and in fluid communication with the perforations 80 on a forward surface of the spacer 64, the blower 100 thus provides an airflow through the permeable foam layer 26, whereby air proximate the forward surface of the permeable foam layer 26 is displaced away from the forward surface of the permeable foam layer 26 and is circulated through the raised seatback by operation of the blower 100.

The blower 100 is in electrical communication with an electronic control module 148. The electronic control module 148 sends a signal to the blower 100 to turn on the blower 100 based on an input command from the occupant. The input command can be obtained via an electronic switch 150 within the motor vehicle 4. The electronic switch 150 can be a conventional on/off switch, as shown, or presented through an integrated in-vehicle communications and entertainment system in the motor vehicle dashboard 152. Alternatively, the input command may be obtained via a voice command presented through an integrated in-vehicle communications and entertainment system in the dashboard 152. Additionally, the input signal may be obtained from a thermocouple 154 disposed proximate the forward surface 40 of the permeable foam layer 26 and a predetermined temperature setting selected by the occupant. The electronic control module 148 sends a signal to the blower 100 to turn on the blower 100 based on the input command from the occupant to activate the blower 100 between any of an "on" condition, an "on-high" condition, an "on-low" condition, and an "off" condition.

In operation, the air proximate the forward surface 40 of the permeable foam layer 26 is warmed by the occupant and the resulting increased thermal energy proximate the forward surface 40 of the permeable foam layer 26 is lowered by operating the blower 100 to force air from exterior the raised seatback support 14 into the airflow passages 72 of the distribution system 28 in fluid communication with the apertures 44 in the permeable foam layer 26 to displace the air proximate the forward surface 40 of the permeable foam layer 26. The air may be exhausted from the raised seatback support 14 via vents 156. Alternatively, the air proximate the forward surface 40 of the permeable foam layer 26 is warmed by the occupant, and the resulting increased thermal energy proximate the forward surface 40 of the permeable foam layer 26 is lowered by operating the blower 100 to draw air proximate the forward surface 40 of the permeable foam layer 26 through the airflow passages 72 of the distribution system 28 in fluid communication with the apertures 44 in the permeable foam layer 26 to withdraw the air proximate the forward surface 40 of the permeable foam layer 26 from the raised seatback support 14 via the blower 100. Fresh air may be supplied to the raised seatback support 14 via the vents 156.

The carrier assembly 30 is cradled within a protective recess 158 provided on the frame assembly 32 to support the back of the occupant occupying the vehicle seating assembly 10. The frame assembly 32 is disposed rearward of and juxtaposed with the carrier assembly 30. The frame assembly 32 is preferably enclosed within the clam-shell exterior rear trim panel 22. The protective recess 158 of the frame assembly 32 is sized and shaped to accept within its volume the carrier assembly 30, which is therefore shielded from view of the vehicle occupants. In contrast, the permeable foam layer 26 and distribution system 28, disposed within the cavity 66 of the permeable foam layer 26 but outside of the protective recess 158 due to the rearward facing lip 58 on the permeable foam layer 26, are fully visible to view beneath the flexible trim cover 24. Similarly, the head restraint 36 is coupled with a top portion 160 of the frame assembly 32 of the raised seatback support 14 and is exposed to view.

As a further feature of the disclosed raised seatback support 14 consisting of the multilayer assembly discussed above, the raised seatback support 14 includes a first periphery 162 about the permeable foam layer 26 and a second periphery 164 about the frame assembly 32. An external peripheral gap 166 is defined between the first periphery 162 and the second periphery 164. By creating the aforementioned gap 166, the upper lateral flex members 136 and the lower lateral flex members 138 may be displaced rearward relative the frame assembly 32 without interference from any of the frame assembly 32, thus allowing the occupant to move in the seat and allow the upper lateral flex members 136 and the lower flex members 138 to accommodate such movement. Overall, the effect is a more comfortable raised seating support 14, particularly for driving long distances.

Thus, the vehicle seating assembly 10 of the present disclosure provides an assembly wherein the permeable foam layer 26 and distribution system 28 form an exposed assembly, and the carrier assembly 30 is received within the protective recess 158 provided on the frame assembly 32. Preferably, the side trim panels 18 and the clam-shell exterior rear trim panel 22 are colored in contrasting color to the coloring of the flexible trim cover 24, 34 for an aesthetically pleasing effect.

The vehicle seating assembly 10 described above thus provides a method of cooling a vehicle seating assembly 10 for a motor vehicle 4. By providing a permeable foam layer 26 upon which an occupant is supported, the permeable foam layer 26 creates a structure through which airflow may be created. Disposing a distribution system 28 having airflow passages 72 therethrough against the permeable foam layer 26 allows the airflow passages 72 of the distribution system 28 to be in fluid communication with the apertures 44 in the permeable foam layer 26. Finally, disposing a carrier assembly 30 against the distribution system 28, where an upper portion 88 of the carrier assembly 30 has a central annual member 92 supported by a plurality of flexible radial arms 94, allows the attachment of a blower 100 to the central annular member 92 of the carrier assembly 30. Since the blower 100 is in fluid communication with the airflow passages 72 of the distribution system 28 and the apertures 44 in the permeable foam layer 26, operating the blower 100 causes air proximate the forward surface 40 of the permeable foam layer 26 to be displaced away from the forward surface 40 of the permeable foam layer 26 and circulated through the raised seatback support 14.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly for a motor vehicle having a lower seating structure and a raised seatback, wherein one of the lower seating structure or the raised seatback includes a flexible multilayer assembly comprising:
  a permeable foam layer upon which an occupant is supported, the permeable foam layer having a forward and rearward surface and a plurality of spaced apertures extending therethrough between the forward and rearward surfaces within which an airflow may be created;
  a distribution system having airflow passages therethrough juxtaposed against the permeable foam layer, the airflow passages of the distribution system being in fluid communication with the apertures in the permeable foam layer;
  a carrier assembly juxtaposed against the distribution system and having an upper portion having a central annular member supported by a plurality of flexible radial arms disposed about a periphery of the central annular member; and
  a blower attached to the central annular member of the carrier assembly, the blower being in fluid communication with the airflow passages of the distribution system and the apertures in the permeable foam layer, whereby air proximate the forward surface of the permeable foam layer is displaced away from the forward surface of the permeable foam layer and is circulated through the lower seating structure or the raised seatback by operation of the blower;
  wherein the distribution system is a semi-rigid fabric spacer fabricated as a single piece from a semi-rigid injection molded thermoplastic material comprising an inner air plenum having a plurality of airflow passages to allow airflow passage through the spacer and wherein the spacer is juxtaposed between the permeable foam layer and the carrier assembly, the spacer having an airtight outer skin and an external opening to the inner air plenum aligned with the airflow of the blower, the air plenum being in fluid communication with the airflow passages within the distribution system, and the spacer having perforations in a portion of the outer skin being in fluid communication with the airflow passages within the distribution system and with the apertures in the permeable foam layer.

2. The vehicle seating assembly of claim 1, wherein air proximate the forward surface of the permeable foam layer is warmed by the occupant and a resulting increased thermal energy proximate the forward surface of the permeable foam layer is lowered by operating the blower to force air from exterior the lower seating structure or the raised seatback into the airflow passages of the distribution system in fluid communication with the apertures in the permeable foam layer to displace the air proximate the forward surface of the permeable foam layer.

3. The vehicle seating assembly of claim 1, wherein the air proximate the forward surface of the permeable foam layer is warmed by the occupant and a resulting increased thermal energy proximate the forward surface of the permeable foam layer is lowered by operating the blower to draw air proximate the forward surface of the permeable foam layer away from the forward surface of the permeable foam layer through the airflow passages of the distribution system in fluid communication with the apertures in the permeable foam layer to withdraw the air proximate the forward surface of the permeable foam layer.

4. The vehicle seating assembly of claim 1, wherein the spacer is fabricated from semi-rigid polyurethane.

5. The vehicle seating assembly of claim 4, wherein the permeable foam layer and the spacer each include longitudinally aligned permeable wings that extend laterally from each side of the lower seating structure or the raised seatback, the permeable foam layer has a plurality of perforations disposed on and extending between inner and outer surfaces of the permeable foam layer, and wherein the perforations on the spacer are disposed on the wings of the spacer and the apertures in the permeable foam layer are disposed on the permeable wings of the permeable foam layer, whereby the perforations on the spacer are aligned with the apertures in the permeable foam layer.

6. The vehicle seating assembly of claim 4, wherein the central annular member supported by the plurality of flexible radial arms has an opening aligned with the external opening of the spacer, wherein a nozzle of the blower is received within the opening of the central annular member and the external opening of the spacer is in fluid communication with a recess formed proximate the inner air plenum of the spacer.

7. The vehicle seating assembly of claim 4, wherein the carrier assembly further comprises an open lower portion and a suspension layer having an adjustable firmness mounted therein.

8. The vehicle seating assembly of claim 7, wherein the flexible dynamic layer comprises a suspension layer formed from tunable springs by which a stiffness of the lower seating structure or the raised seatback support can be adjusted.

9. The vehicle seating assembly of claim 7, wherein the permeable foam layer and the distribution system are further comprised of upper and lower portions corresponding and longitudinally aligned with the upper and lower portions of the carrier assembly, and wherein the permeable foam layer and the spacer each include longitudinally aligned flexible wings that extend laterally from each side of the lower portion thereof, and wherein the perforations on the spacer are disposed on the flexible wings of the spacer and the apertures in the permeable foam layer are disposed on the flexible wings of the permeable foam layer, whereby the perforations on the spacer are aligned with the apertures in the permeable foam layer.

10. The vehicle seating assembly of claim 1, wherein the blower is in electrical communication with an electronic control module, whereby the electronic control module sends a signal to the blower to turn on the blower based on an input command from the occupant.

11. The vehicle seating assembly of claim 10, wherein the input command is obtained via an electronic switch within the motor vehicle.

12. The vehicle seating assembly of claim 11, wherein the electronic switch within the motor vehicle is presented through an integrated in-vehicle communications and entertainment system.

13. The vehicle seating assembly of claim 10, wherein the input command is obtained via a voice command presented through an integrated in-vehicle communications and entertainment system.

14. The vehicle seating assembly of claim 10, wherein the electronic control module sends a signal to the blower to turn on the blower based on an input command from the occupant to activate the blower between any of an on condition, an on-high condition, an on-low condition and an off condition.

15. The vehicle seating assembly of claim 1, wherein the blower is in electrical communication with an electronic control module, whereby the electronic control module sends a signal to the blower to turn on the blower based on an input from a thermocouple disposed proximate the forward surface of the permeable foam layer and a predetermined temperature setting selected by the occupant.

16. The vehicle seating assembly of claim 1, wherein the permeable foam layer is covered by a flexible covering.

17. A vehicle seat comprising:
a foam layer having apertures;
a distribution system having passages in fluid communication with the apertures;
a carrier assembly having a central annular member supported by flexible radial arms disposed about a periphery of the central annular member; and
a blower attached to the central annular member in fluid communication with the passages and the apertures, whereby air is displaced away from the foam layer by operation of the blower;
wherein the distribution system comprises a semi-rigid fabric spacer fabricated as a single piece from a semi-rigid injection molded thermoplastic material comprising an inner air plenum having a plurality of airflow passages to allow airflow passage through the spacer and wherein the spacer is juxtaposed between the foam layer and the carrier assembly, the spacer having an airtight outer skin and an external opening to the inner air plenum aligned with an airflow of the blower, the air plenum being in fluid communication with the airflow passages within the distribution system, and the spacer having perforations in a portion of an outer skin thereof being in fluid communication with the airflow passages within the distribution system and with the apertures in the foam layer.

18. The vehicle seat of claim 17, wherein the distribution system is a semi-rigid fabric spacer juxtaposed between the foam layer and the carrier assembly, the spacer having an airtight outer skin and an external opening to an inner air plenum aligned with an airflow of the blower, the air plenum being in fluid communication with the passages within the distribution system, and the spacer having perforations in a portion of the outer skin being in fluid communication with passages within the distribution system and with the apertures in the foam layer, and wherein the central annual member supported by the plurality of flexible radial arms has an opening aligned with the external opening of the spacer, wherein a nozzle of the blower is received within the opening of the central annual member and the external opening of the spacer is in fluid communication with a recess formed proximate the inner air plenum of the spacer.

19. A method of cooling a vehicle seat for a motor vehicle, the method comprising the steps of:
providing a permeable foam layer upon which an occupant is supported, the permeable foam layer having a forward and rearward surface and a plurality of spaced apertures extending therethrough between the forward and rearward surfaces within which an airflow may be created;
disposing a distribution system having airflow passages therethrough against the permeable foam layer, the airflow passages of the distribution system being in fluid communication with the apertures in the permeable foam layer;
disposing a carrier assembly juxtaposed against the distribution system and having an upper portion having a central annular member supported by a plurality of flexible radial arms disposed about a periphery of the central annular member;
attaching a blower to the central annular member of the carrier assembly, the blower being in fluid communication with the airflow passages of the distribution system and the apertures in the permeable foam layer; and
operating the blower whereby air proximate the forward surface of the permeable foam layer is displaced away from the forward surface of the permeable foam layer and is circulated through the seat by operation of the blower;
wherein the distribution system comprises a semi-rigid fabric spacer fabricated as a single piece from a semi-rigid injection molded thermoplastic material comprising an inner air plenum having a plurality of airflow passages to allow airflow passage through the spacer and wherein the spacer is juxtaposed between the permeable foam layer and the carrier assembly, the spacer having an airtight outer skin and an external opening to the inner air plenum aligned with the airflow of the blower, the air plenum being in fluid communication with the airflow passages within the distribution system, and the spacer having perforations in a portion of the outer skin being in fluid communication with the airflow passages within the distribution system and with the apertures in the permeable foam layer.

20. The method of claim 19, wherein the air proximate the forward surface of the permeable foam layer is warmed by the occupant and a resulting increased thermal energy proximate the forward surface of the permeable foam layer is lowered by operating the blower to force air from exterior the seat into the airflow passages of the distribution system in fluid communication with the apertures in the permeable foam layer to displace the air proximate the forward surface of the permeable foam layer.

\* \* \* \* \*